US012754864B2

(12) United States Patent
Harris et al.

(10) Patent No.: US 12,754,864 B2
(45) Date of Patent: Oct. 6, 2026

(54) ACCELERATION FRAMEWORK TO CHAIN IPU ASIC BLOCKS

(71) Applicant: Intel Corporation, Santa Clara, CA (US)

(72) Inventors: James R. Harris, Chandler, AZ (US); Benjamin Walker, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/069,088

(22) Filed: Dec. 20, 2022

(65) Prior Publication Data

US 2023/0205715 A1 Jun. 29, 2023

(51) Int. Cl.
*G06F 13/28* (2006.01)

(52) U.S. Cl.
CPC .......... *G06F 13/28* (2013.01); *G06F 2213/28* (2013.01)

(58) Field of Classification Search
CPC ............................ G06F 13/28; G06F 2213/28
See application file for complete search history.

(56) References Cited

U.S. PATENT DOCUMENTS

2021/0117249 A1* 4/2021 Doshi .................. G06F 9/5077
2022/0210075 A1* 6/2022 Musleh .................. H04L 47/30
2023/0018221 A1* 1/2023 Pattan .................. G06F 1/3243
2023/0305977 A1* 9/2023 Glimcher ................ H04L 67/08
2024/0160368 A1* 5/2024 Bahirat ................ G06F 3/0679

OTHER PUBLICATIONS

Intel, "Introduction to the Storage Performance Development Kit (SPDK)", Published: Sep. 19, 2015, Last Updated: Dec. 5, 2016, 1 page.

* cited by examiner

*Primary Examiner* — Henry Tsai
*Assistant Examiner* — Aurangzeb Hassan
(74) *Attorney, Agent, or Firm* — Compass IP Law PC

(57) ABSTRACT

A method is described. The method includes receiving a first invocation for a first ASIC block on a semiconductor chip. The first invocation provides a value. The method includes receiving a second invocation for a second ASIC block on the semiconductor chip. The second invocation also provides the value. The method includes determining that the second ASIC block is to operate on output from the first ASIC block from the first and second invocations having both provided the value. The method includes using a first device driver for the first ASIC block and a second device driver for the ASIC block to cause the second ASIC block to operate on the output from the first ASIC block.

17 Claims, 5 Drawing Sheets

ACCELERATION FRAMEWORK TO CHAIN IPU ASIC BLOCKS

BACKGROUND OF THE INVENTION

With the semiconductor manufacturing minimum feature sizes reaching into the single nanometers, semiconductor chips are being developed having significant amounts of disparate functionality being integrated on a single semiconductor chip. As such, system designers are interested in finding out ways to combine any/all of these functions to effect complex computational processes.

DETAILED DESCRIPTION

A new data center paradigm is emerging in which "infrastructure" tasks are offloaded from traditional general purpose "host" CPUs (where application software programs are executed) to an infrastructure processing unit (IPU), data processing unit (DPU) or smart networking interface card (SmartNIC), any/all of which are hereafter referred to as an IPU.

Networked based computer services, such as those provided by cloud services and/or large enterprise data centers, commonly execute application software programs for remote clients. Here, the application software programs typically execute a specific (e.g., "business") end-function (e.g., customer servicing, purchasing, supply-chain management, email, etc.). Remote clients invoke/use these applications through temporary network sessions/connections that are established by the data center between the clients and the applications.

In order to support the network sessions and/or the applications' functionality, however, certain underlying computationally intensive and/or trafficking intensive functions ("infrastructure" functions) are performed.

Examples of infrastructure functions include encryption/decryption for secure network connections, compression/decompression for smaller footprint data storage and/or network communications, virtual networking between clients and applications and/or between applications, packet processing, ingress/egress queuing of the networking traffic between clients and applications and/or between applications, ingress/egress queueing of the command/response traffic between the applications and mass storage devices, error checking (including checksum calculations to ensure data integrity), distributed computing remote memory access functions, etc.

Traditionally, these infrastructure functions have been performed by the host CPUs "beneath" their end-function applications. However, the intensity of the infrastructure functions has begun to affect the ability of the host CPUs to perform their end-function applications in a timely manner relative to the expectations of the clients, and/or, perform their end-functions in a power efficient manner relative to the expectations of data center operators. Moreover, the host CPUs, which are typically complex instruction set (CISC) processors, are better utilized executing the processes of a wide variety of different application software programs than the more mundane and/or more focused infrastructure processes.

Figure 1:
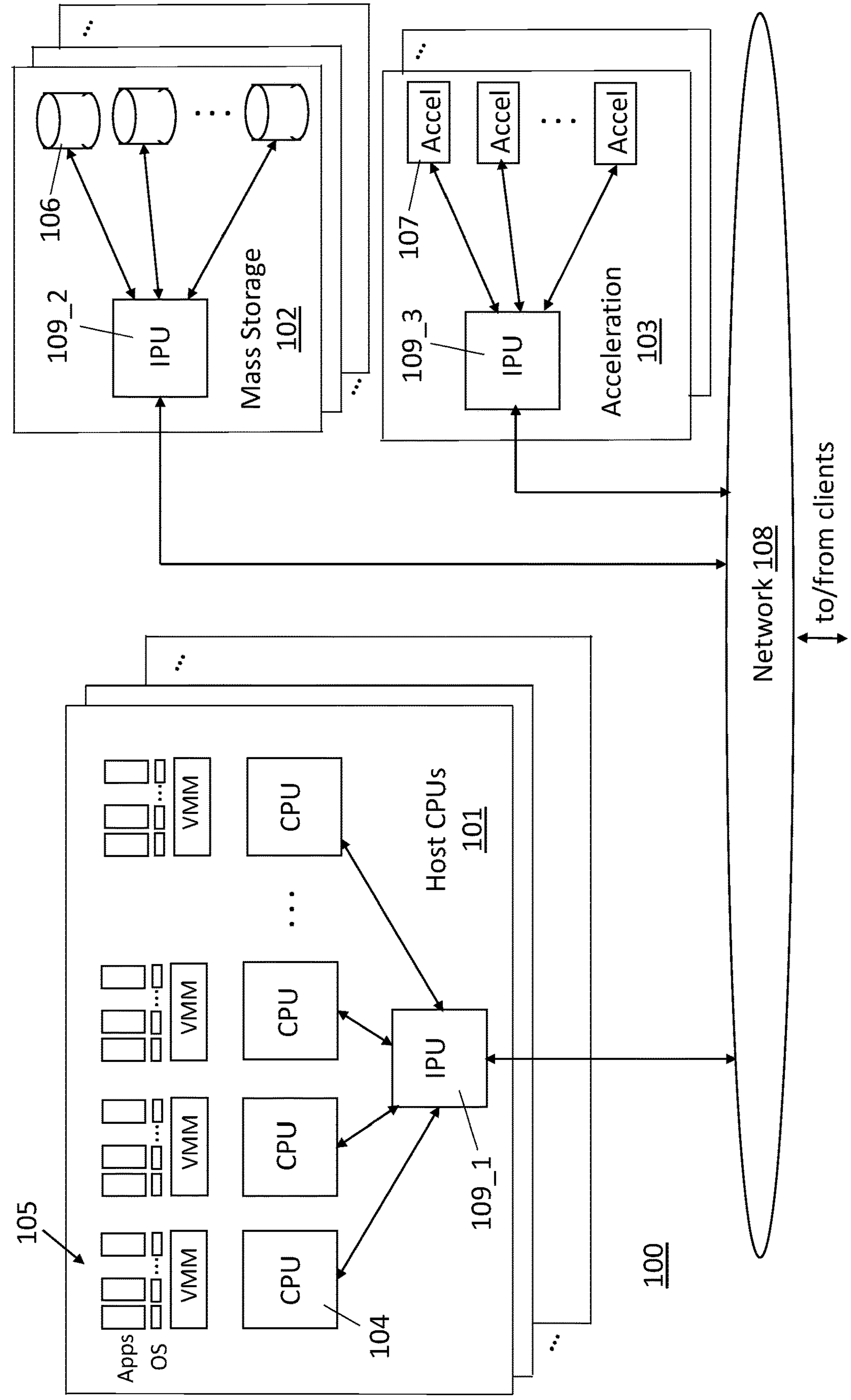
FIG. 1 depicts a data center.

As such, as observed in FIG. 1, the infrastructure functions are being migrated to an infrastructure processing unit. FIG. 1 depicts an exemplary data center environment 100 that integrates IPUs 107 to offload infrastructure functions from the host CPUs 101 as described above. As observed in FIG. 1, the exemplary data center environment 100 includes pools 101 of host CPUs 104 that execute the end-function application software programs 105 that are typically invoked by remotely calling clients. The data center also includes separate mass storage pools 102 and application acceleration resource pools 103 to assist the executing applications.

Here, for instance, the mass storage pools 102 includes numerous storage devices 106 (e.g., solid state drives (SSDs)) to support "big data" applications, database applications or even remotely calling clients that desire to access data that has been previously stored in a mass storage pool 102. The application acceleration resource pool 103 includes numerous specific processors (acceleration cores) 107 (e.g., GPUs) that are tuned to better perform certain numerically intensive, application level tasks (e.g., machine learning of customer usage patterns, image processing, etc.). In a common scenario, applications 105 running on the host CPUs 104 access a mass storage pool 102 to obtain data that the applications perform operations upon, and/or, invoke an acceleration resource pool 103 to "speed-up" certain numerically intensive functions.

The host CPU, mass storage and acceleration pools 101, 102, 103 are respectively coupled by one or more networks 108. Notably, each pool 101, 102, 103 has an IPU 109_1, 109_2, 109_3 on its front end or network side. Here, the IPU 109 performs pre-configured infrastructure functions on the inbound (request) packets it receives from the network 108 before delivering the requests to its respective pool's end function (e.g., application software program 105, mass storage device 106, acceleration core 107). As the end functions send their output responses (e.g., application software resultants, read data, acceleration resultants), the IPU 109 performs pre-configured infrastructure functions on the outbound packets before transmitting them into the network 108.

Figure 2:
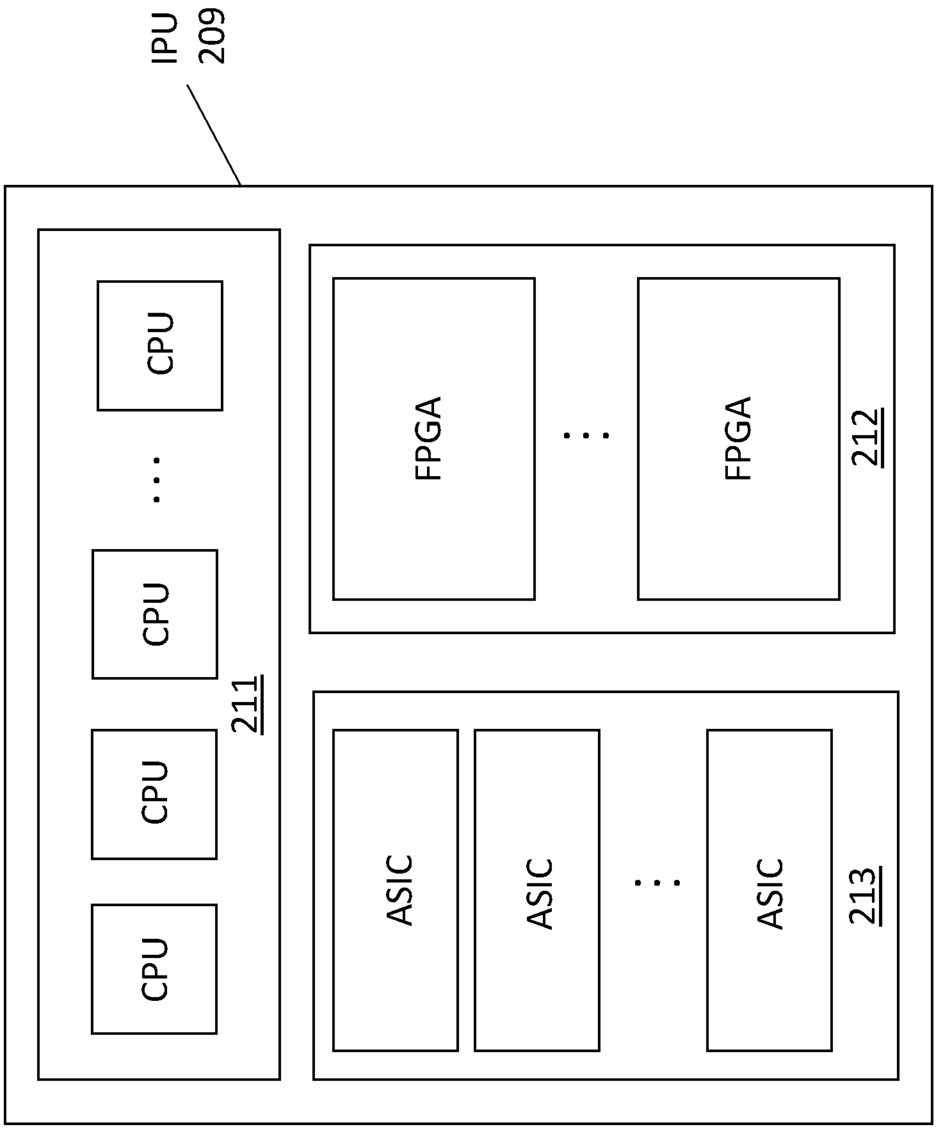
FIG. 2 depicts an IPU.

FIG. 2 shows an exemplary IPU 209. As observed in FIG. 2 the IPU 209 includes a plurality of general purpose processing cores 211, one or more field programmable gate arrays (FPGAs) 212 and one or more acceleration hardware (ASIC) blocks 213. The processing cores 211, FPGAs 212 and ASIC blocks 213 represent different tradeoffs between versatility/programmability, computational performance and power consumption. Generally, a task can be performed faster in an ASIC block and with minimal power consumption, however, an ASIC block is a fixed function unit that can only perform the functions its electronic circuitry has been specifically designed to perform.

The general purpose processing cores 211, by contrast, will perform their tasks slower and with more power consumption but can be programmed to perform a wide variety of different functions (via the execution of software programs). Here, it is notable that although the processing cores can be general purpose CPUs like the data center's host CPUs 104, in many instances the IPU's general purpose processors 211 are reduced instruction set (RISC) based processors rather than CISC based processors (which the host CPUs 104 are typically implemented with). That is, the host CPUs 104 that execute the data center's application software programs 105 tend to be CISC based processors because of the extremely wide variety of different tasks that the data center's application software could be programmed to perform.

By contrast, the infrastructure functions performed by the IPUs tend to be a more limited set of functions that are better served with a RISC processor. As such, the IPU's RISC processors can perform the infrastructure functions with noticeably less power consumption than CISC processors without significant loss of performance.

The FPGA(s) 212 provide for more programming capability than an ASIC block but less programming capability than the general purpose cores 211, while, at the same time, providing for more processing performance capability than the general purpose cores 211 but less than processing performing capability than an ASIC block.

Figure 3:
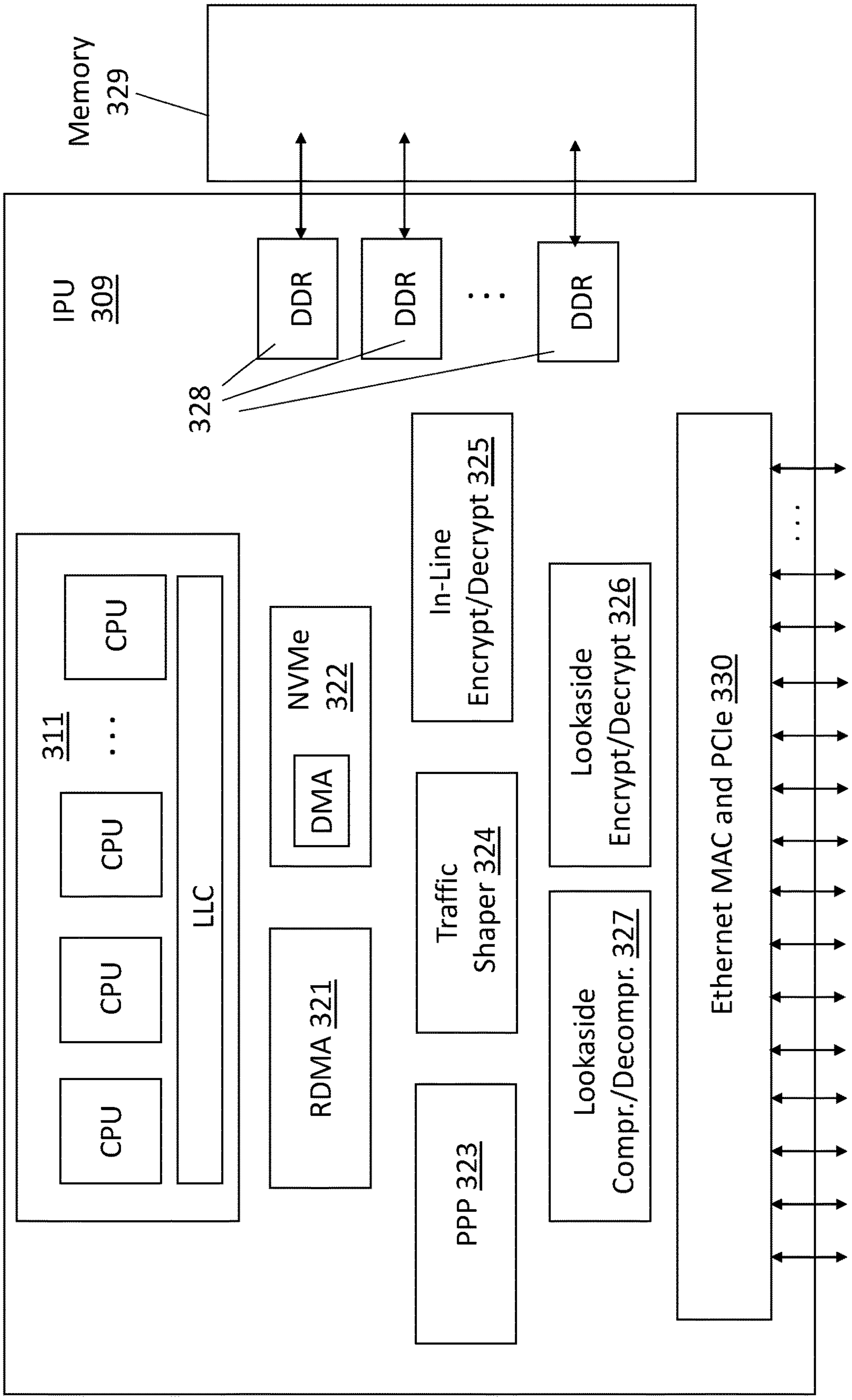
FIG. 3 depicts a specific embodiment of an IPU.

FIG. 3 shows a more specific embodiment of an IPU. For ease of explanation the IPU of FIG. 3 does not include a FPGA blocks. As observed in FIG. 3 the IPU includes a plurality of general purpose cores and a last level caching layer for the RISC cores. The IPU also includes a number of hardware ASIC acceleration blocks including: 1) an RDMA acceleration ASIC block 321 that performs RDMA protocol operations in hardware; 2) an NVMe acceleration ASIC block 322 that performs NVMe protocol operations in hardware; 3) a packet processing pipeline ASIC block 323 that parses ingress packet header content, e.g., to assign flows to the ingress packets, perform network address translation, etc.; 4) a traffic shaper 324 to assign ingress packets to appropriate queues for subsequent processing by the IPU 309; 5) an in-line cryptographic ASIC block 325 that performs decryption on ingress packets and encryption on egress packets; 6) a lookaside cryptographic ASIC block 326 that performs encryption/decryption on blocks of data, e.g., as requested by a host CPU 104; 7) a lookaside compression ASIC block 327 that performs compression/decompression on blocks of data, e.g., as requested by a host CPU 104; 8) checksum/cyclic-redundancy-check (CRC) calculations (e.g., for NVMe/TCP data digests and/or NVMe DIF/DIX data integrity); 9) thread local storage (TLS) processes; etc.

The IPU 309 also includes multiple memory channel interfaces 328 to couple to external memory 329 that is used to store instructions for the general purpose cores 311 and input/output data for the IPU cores 311 and each of the ASIC blocks 321-326. The IPU includes multiple PCIe physical interfaces and an Ethernet Media Access Control block 330 to implement network connectivity to/from the IPU 309.

Figure 4:
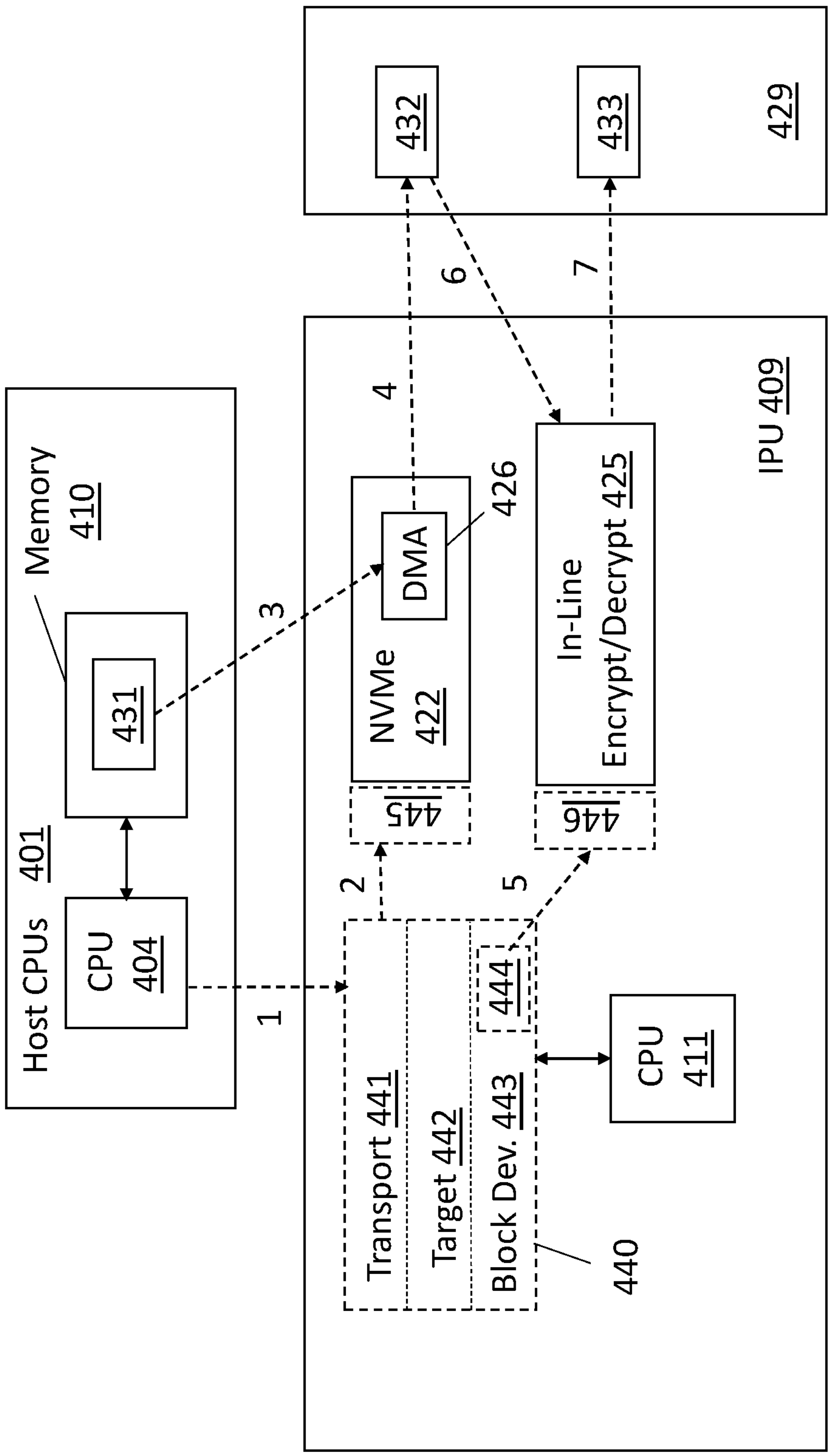
FIG. 4 shows a process for storing a page of data.

FIG. 4 depicts an example of a page of data 431 being stored by an application executing on a host CPU 404 where the IPU 409 acts to accelerate the storage operation. Here, a page of data 431, also referred to as a block of data, is a large (e.g., 4096 bytes (B)) unit of data that is stored in a mass storage device such as a solid state drive (SSD). According to the example of FIG. 4, the software that is executing on the IPU CPU 411 includes a software stack 451 for storage operations. The functions of the software stack 451 act as a control hub of storage operations performed by the IPU 409 including invocation of the storage related ASIC blocks 422, 425 as appropriate.

In the particular example of FIG. 4, the storage related ASIC blocks include the NVMe ASIC block 422 and the encryption ASIC block 425. The ASIC blocks 422, 425 are invoked through their respective device driver software 445, 446. Notably, the software stack 440 includes a transport layer 441 toward the top of the stack 440 and an encryption module 444 towards the bottom of the stack 440.

When the application desires to store the page 431 of data, a message is sent 1 from the application to an IPU core 411 that is processing the storage software stack 440 on behalf of the application. The transport layer 441 of the software stack 440 receives the message and invokes 2 the NVMe ASIC block 422 through the NVMe ASIC block's device driver 445. Here, the NVMe ASIC block 422 includes a direct-memory-access (DMA) sub-ASIC (sASIC) 426 for performing DMAs in hardware. In response to the invocation 2 from the transport layer 441, the DMA sASIC 426 (under control of device driver 445) reads 3 the memory page 431 from host CPU memory 410 and stores 4 the page 432 in IPU memory 429 (the DMA sASIC 426 typically receives the page's location in host CPU memory 410 from the transport layer 441 (via device driver 445) which received it from the application as part of the initial storage request 1).

The storage software stack 440 then proceeds to execute at different layers of the stack as appropriate to perform the storage operation. Here, the NVMe target layer 442 mimics the NVMe protocol behavior of an NVMe storage device so that the application is presented with an experience "as if" it were communicating directly with a storage device. The block device layer 443 includes functionality that is traditionally found in an operating system directly above a storage device's device driver for communicating with storage device and controlling the storage device (e.g., submission queueing, completion queuing, timeout monitoring, reset handling, etc.).

The block device layer 443 also includes an encryption engine 444 that invokes the device driver 446 of the encryption ASIC block 425 if encryption is to be performed. Thus, if the page of data 432 is to be encrypted before it is physically sent to remote storage, the block device layer 443 will invoke the encryption engine 444 which, in turn, invokes 5 the encryption ASIC block 425 through its device driver 446 to encrypt the page. In response to the invocation 5, the encryption ASIC block 425 will read 6 the DMA'd page 432 from its location in IPU memory 429, encrypt the page and store the encrypted page 433 as another page in IPU memory 429.

Thus, for any page to be stored requiring encryption, there will be two separate instances of the page 432, 433 stored in IPU memory 429 (the unencrypted page 432 that was received via DMA and the encrypted page 433). Here, the transport and block device layers 441, 443 in the software stack 440 operate in isolation as two separate processes that write their respective outputs 4, 7 (the DMA'd page 432 and the encrypted page 433) to two different locations in IPU memory 429.

A problem is the amount of memory 429 that is available on the IPU. Consumption of two entire pages 432, 433 of data in IPU memory 429 per page write operation is inefficient and can create situations where the IPU 409 does not have enough memory space to process inbound data at the rate it is expected to.

Figure 5:
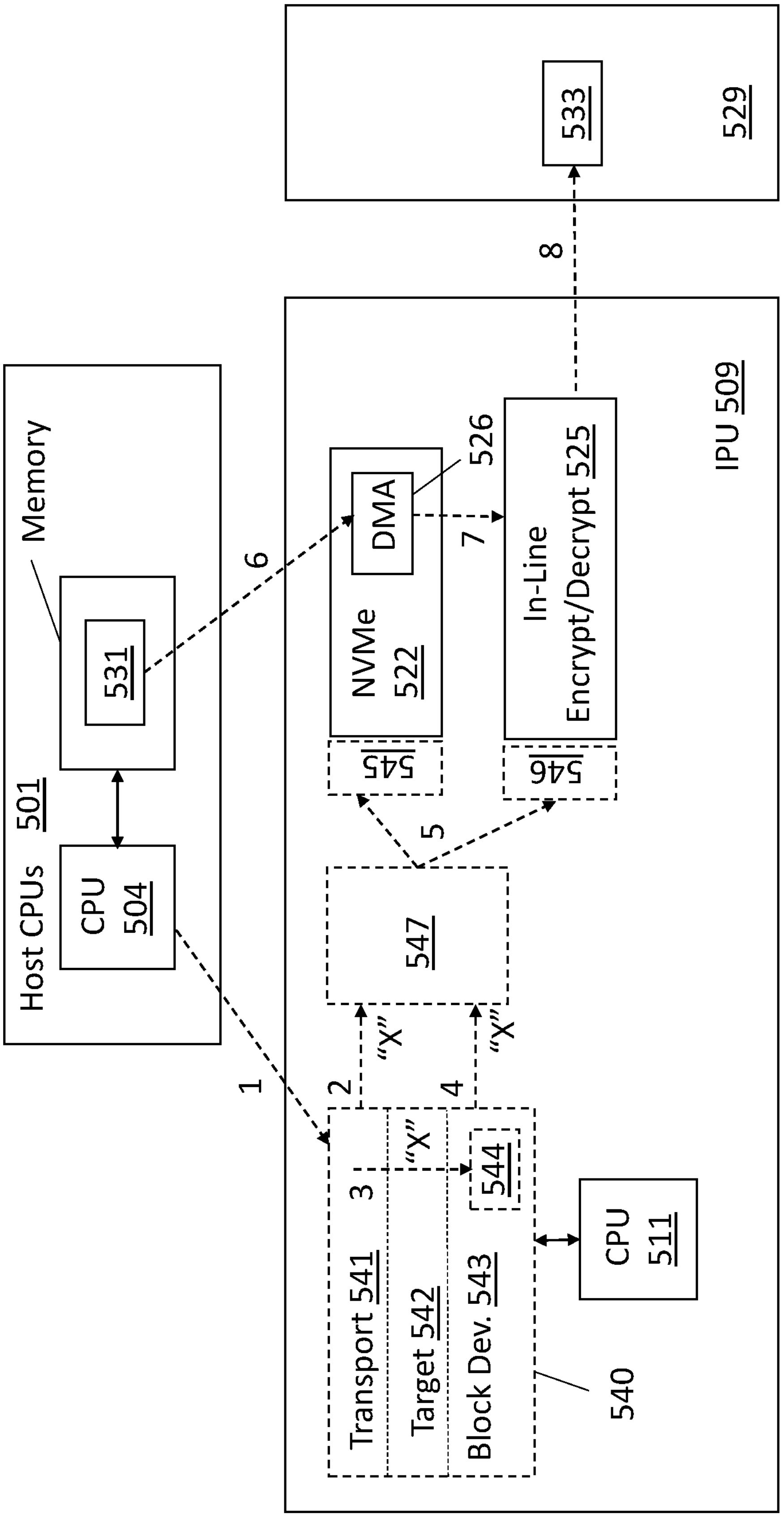
FIG. 5 shows an improved process for storing a page of data.

A solution, as observed in FIG. 5, is to combine the DMA and encryption operations into a single process by "chaining" encryption to the output 7 of a DMA operation. The ability to chain ASIC blocks such that one ASIC block operates directly upon the output of another ASIC block depends on the hardware implementation of IPU 509 and its respective ASIC blocks. However, as an example, if a page is 4096 bytes (B) and the DMA sASIC transfers are effected as a sequence of sixty-four 64 B transfers (64×64 B=4096 B), and the encryption ASIC block 525 accepts input data in units of 64 B, the encryption ASIC block 525 can operate directly on the 64 B chunks of the page 531 that are transferred into the IPU 509 by the DMA sASIC 526.

That is, the sequence of 64 B units that are sequentially brought into the IPU 509 by the DMA sASIC 526 can be directly (or indirectly via a 64 B buffer in IPU memory 529 or IPU register space) streamed to the encryption ASIC block 525 which encrypts the 64 B units as they arrive and then stores them in IPU memory 529 in encrypted form 533.

According to one approach, the transport layer 541 of the software stack 540 is expanded to include its own encryption engine 544 so that the transport layer 541 can invoke the encryption ASIC 525 device driver 546 and arrange for encryption to be performed directly on DMA output 7.

Unfortunately, the addition of a second encryption engine to the transport layer 541 increases the size of the IPU's overall code footprint (the software stack 540 now includes two encryption engines (one at each of the transport 541 and block device 543 layers) instead of just one encryption engine at the block device layer 543). The expansion of program code does not necessarily solve the problem because, although additional IPU memory space is not needed for a second version of the payload, more IPU memory space is nevertheless needed for the program code of the second encryption engine.

A better approach, as observed in FIG. 5, is to create a software framework that is able to chain different combinations of ASIC hardware block functions in series even though the program code for the invoking of the different ASIC blocks reside at different layers in the software stack 540. Thus, the approach of FIG. 5 aims to chain encryption to the output 7 of the DMA operation but nevertheless utilize the encryption engine 544 that resides in the block device layer 543 when doing so (a second instance of the encryption engine is not necessary).

As observed in FIG. 5, the IPU Includes a software acceleration framework 547 that operates between the software stack 540 and the ASIC block device drivers 545, 546. The acceleration framework 547 directly controls the ASIC blocks 522, 525 through their respective device drivers 545, 546 and therefore has the ability to implement the chained operation of one ASIC block operating directly on the output of another ASIC for those ASIC block chains that the IPU hardware can actually perform. In order for any software layer in the stack 540 to invoke use of any ASIC block, the invocation is passed to the acceleration framework 547, which, in turn, invokes the corresponding ASIC block device driver to initiate actual ASIC block operation.

Here, when the transport layer 541 receives the request 1 from the application software, the transport layer 541 passes 2 a variable "X" to the acceleration framework 547 in order to effectively request use of the DMA sASIC 526.

Importantly, the transport layer 541 is also written to invoke 3 the encryption ASIC block 525 through the block device layer 543 and its encryption engine 544 which includes passing the same variable "X" to the encryption engine 544. Thus, unlike the above mentioned approach which incorporates an entire second encryption into the transport layer 541, by contrast, in the improved approach of FIG. 5, the transport layer 541 is modified to merely include an invocation to the block device layer's encryption engine 544 for those page storage operations requiring encryption.

In response to the invocation 3 from the transport layer 541, the encryption engine 544 within the block device layer 543 passes 4 the same variable "X" to the acceleration framework 547 in order to effectively request use of the encryption ASIC block 525. When the acceleration framework 547 observes two concurrent requests 2, 4 that passed the same variable "X", the acceleration framework 547 understands that chaining is being requested.

That is, the acceleration framework 547 understands that the encryption ASIC 525 is to operate directly upon the DMA output 7 from the DMA sASIC 526. The acceleration framework 547 then arranges, through appropriate manipulation 5 of device drivers 545, 546, for the DMA output stream 7 to be presented as an input stream to the encryption ASIC 525. As such, a full un-encrypted page is never stored in the IPU memory 529. Rather, at the completion of the chained operation, only a full encrypted page is stored in the IPU memory 529.

In various embodiments, the acceleration framework 547 is designed to pause, suspend or otherwise not take immediate action when a layer from a software stack attempts to invoke an accelerator. For example, upon the acceleration framework 547 receiving the earlier invocation 2 from the transport layer 541, rather than immediately invoke the NVMe device driver 545, the acceleration framework 547 pauses and waits to see if any immediately following invocations are made from other (e.g., deeper) layers of the software stack to the acceleration framework 547 using the same value "X".

Thus, in various embodiments, the acceleration framework 547 is designed to wait for an appropriate number of machine cycles to see if any subsequent invocations include the same variable. Once enough time has passed for all lower stack layers to have invoked an ASIC block, the acceleration framework 547 understands which ASIC blocks are to be chained. Note that later invocations typically are made by deeper layers of the software which, in turn, correspond to properly made later operations (first, DMA of the page, and then, encryption of the page). Thus, the acceleration framework 547 can infer the correct order of the ASIC block chain from the order in which invocations that include the same value are received by the acceleration framework 547.

In various embodiments, the storage software stack includes 540 includes layers from the Storage Platform Development Kit (SPDK), such as lower layers 542, 543 and the value X is a virtual "memory domain" (SPDK permits its software layers to receive virtual memory domains as input variables) or other virtual/dummy memory location value.

In various embodiments, the acceleration framework 547 is designed with the knowledge of which ASIC blocks can be chained and in which order, including, chains of more than two ASIC blocks. For those ASIC block chains that the underlying hardware can actually implement, the acceleration framework 547 or associated meta data identifies these "workable" chains so that the various layers of software executed by the IPU processing cores 511 can be written to construct them. As invocations are received by the acceleration framework 547 during runtime, the acceleration framework 547 first confirms that any requested chain (as inferred from a series of invocations that include the same variable) is included in the list of workable chains.

Although embodiments above have emphasized the chaining of ASIC blocks for storage purposes, other chaining possibilities can be implemented depending on hardware capability. Examples include chaining: 1) calculating cyclic redundancy check (CRC) information on an outbound page to be stored with a third ASIC block that follows the DMA and encryption engine blocks; 2) CRC (first ASIC block) and decryption (second ASIC block) for a page being read from remote storage; 3) DMA (first ASIC block) and digital signature determination (integrity check value (ICV)) (second ASIC block) for output IPSec egress packets; 4) DMA (first ASIC block), ICV determination (second ASIC block) and encryption (third ASIC block) for output IPSec egress packets; 5) authentication (first ASIC block) and decryption (second ASIC block) for IPSec ingress packets; 6) DMA (first ASIC block) then compression (second ASIC block) then encryption (third ASIC block) (e.g., in an egress direction); 7) decryption (first ASIC block) then decompression (second ASIC block) then DMA (third ASIC block) (e.g., in an ingress direction); etc.

For the IPSec implementations described just above, the software layers that invoke the acceleration framework can be Data Plane Development Kit (DPDK) software layers of a DPDK software stack.

In various embodiments the device drivers 545, 546 and acceleration framework 547 execute on a same IPU processing core. The software stack 540 can also execute on the same IPU processing core as the device drivers 545, 546 and acceleration framework 547, or, on a different IPU processing core. In other embodiments the device drivers 545, 546 operate on a different processing core than the acceleration framework 547.

Referring back to FIG. 1, in various embodiments, the host CPUs 104 and IPU 109_1 of a host CPU pool 101 are integrated on a same semiconductor chip, or, on different semiconductor chips. In the case of the later, the host CPUs 104 and IPU 109_1 can be different components of, e.g., a same rack mountable server computer, or, the host CPUs 104 and IPU 109_1 can be implemented within different rack mountable components as a disaggregated computing solution.

Also, in various embodiments, the platform on which the applications 105 are executed include a virtual machine monitor (VMM), or hypervisor, that instantiates multiple virtual machines (VMs). Operating system (OS) instances respectively execute on the VMs and the applications execute on the OS instances. Alternatively or combined, container engines (e.g., Kubernetes container engines) respectively execute on the OS instances. The container engines provide virtualized OS instances and containers respectively execute on the virtualized OS instances. The containers provide isolated execution environment for a suite of applications which can include, applications for micro-services.

Embodiments of the invention may include various processes as set forth above. The processes may be embodied in program code (e.g., machine-executable instructions). The program code, when processed, causes a general-purpose or special-purpose processor to perform the program code's processes. Alternatively, these processes may be performed by specific/custom hardware components that contain hard wired interconnected logic circuitry (e.g., application specific integrated circuit (ASIC) logic circuitry) or programmable logic circuitry (e.g., field programmable gate array (FPGA) logic circuitry, programmable logic device (PLD) logic circuitry) for performing the processes, or by any combination of program code and logic circuitry.

Elements of the present invention may also be provided as a machine-readable medium for storing the program code. The machine-readable medium can include, but is not limited to, floppy diskettes, optical disks, CD-ROMs, and magneto-optical disks, FLASH memory, ROMs, RAMs, EPROMs, EEPROMs, magnetic or optical cards or other type of media/machine-readable medium suitable for storing electronic instructions.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A non-transitory machine readable medium containing program code that when processed by a processor causes a method to be performed, the method comprising:

receiving a first invocation for a first application specific integrated circuit (ASIC) block on a semiconductor chip, the first invocation providing a value;

receiving a second invocation for a second ASIC block on the semiconductor chip, the second invocation also providing the value;

determining that the second ASIC block is to operate on output from the first ASIC block from the first and second invocations having both provided the value; and using a first device driver for the first ASIC block and a second device driver for the second ASIC block to cause the second ASIC block to operate on the output from the first ASIC block, wherein the output of the first ASIC block is direct memory access (DMA) data and the second ASIC block is to encrypt the DMA data.

2. The non-transitory machine readable medium of claim 1 wherein the semiconductor chip comprises an infrastructure processing unit (IPU).

3. The non-transitory machine readable medium of claim 1 wherein the first invocation is made by a first layer of a software stack and the second invocation is made by a second layer of the software stack.

4. The non-transitory machine readable medium of claim 3 wherein the first layer is higher than the second layer and the first invocation is made before the second invocation.

5. The non-transitory machine readable medium of claim 1 wherein the method further comprises waiting in between the first and second invocations.

6. The non-transitory machine readable medium of claim 1 wherein the value is a Storage Platform Development Kit (SPDK) memory domain value.

7. An apparatus, comprising:

an infrastructure processing unit (IPU) having a processing core, a first application specific integrated circuit (ASIC) block and a second ASIC block;

first device driver program code for the first ASIC block;

second device driver program code for the second ASIC block; and framework program code to execute on the processing core, the framework program code to:

receive a first invocation for the first device driver program code from a first layer of software, the first invocation including a value;

receive a second invocation for the second device driver program code from a second layer of software, the second invocation including the value;

determine that the second ASIC block is to operate on output from the first ASIC block based on the first and second invocations having included the value; and invoke the first and second device driver program codes to cause the second ASIC block to operate on the output from the first ASIC block, wherein the output of the first ASIC block is capable of being direct memory access (DMA) data and the second ASIC block is capable of being an encryption ASIC block to encrypt the DMA data.

8. The apparatus of claim 7 wherein the first layer of a software is to pass the value to the second layer of software before the second layer of software invokes the reception of the second invocation.

9. The apparatus of claim 7 wherein the first layer is higher than the second layer is a same software stack.

10. The apparatus of claim 7 wherein the value is a Storage Platform Development Kit (SPDK) memory domain value.

11. The apparatus of claim 7 wherein the framework program code is to wait in between the first and second invocations.

12. A system, comprising:

a plurality of host processing cores;

a network;

an infrastructure processing unit coupled in between the plurality of host processing cores and the network, the infrastructure processing unit comprising one or more infrastructure processing unit (IPU) processing cores, a first application specific integrated circuit (ASIC) block and a second ASIC block;

first device driver program code for the first ASIC block to execute on at least one of the one or more IPU processing cores;

second device driver program code for the second ASIC block to execute on at least one of the one or more IPU processing cores; and framework program code to execute on at least one of the one or more IPU processing core, the framework program code to:

receive a first invocation for the first device driver program code from a first layer of software, the first invocation including a value;

receive a second invocation for the second device driver program code from a second layer of software, the second invocation including the value;

infer from the first and second invocations having included the value that the second ASIC block is to operate on output from the first ASIC block; and invoke the first and second device driver program codes to cause the second ASIC block to operate on the output from the first ASIC block, wherein the output of the first ASIC block is capable of being direct memory access (DMA) data and the second ASIC block is capable of being an encryption ASIC block to encrypt the DMA data.

13. The system of claim 12 wherein the first layer of a software is to pass the value to the second layer of software before the second layer of software invokes the reception of the second invocation.

14. The system of claim 12 wherein the first layer is higher than the second layer is a same software stack.

15. The system of claim 12 wherein the value is a Storage Platform Development Kit (SPDK) memory domain value.

16. The system of claim 12 wherein the framework program code is to wait in between the first and second invocations.

17. The system of claim 12 wherein the output is part of an IPSec egress packet to be sent on the network.

* * * * *